United States Patent [19]

Boyden

[11] Patent Number: 5,726,362
[45] Date of Patent: Mar. 10, 1998

[54] TENSION LOSS/FREQUENCY COMPARISON DEVICE

[75] Inventor: Willis Guild Boyden, Los Angeles, Calif.

[73] Assignee: Will Boyden Inc., Las Vegas, Nev.

[21] Appl. No.: 629,994

[22] Filed: Apr. 4, 1996

[51] Int. Cl.$^6$ ........................................ G01L 5/10
[52] U.S. Cl. ........................................ 73/862.41
[58] Field of Search ................. 73/862.43, 862.391, 73/862.41, 862.452; 273/73 A, 73 B, 73 E; 84/454, 455, DIG. 18

[56] References Cited

U.S. PATENT DOCUMENTS

| | | | |
|---|---|---|---|
| 4,023,462 | 5/1977 | Denov et al. | 84/455 X |
| 4,044,239 | 8/1977 | Shimauchi et al. | 84/455 X |
| 4,253,374 | 3/1981 | Watterman | 84/455 |
| 5,007,294 | 4/1991 | Matjasic | 73/862.41 |
| 5,024,132 | 6/1991 | Anthony et al. | 84/455 X |
| 5,065,660 | 11/1991 | De Buda | 84/455 X |
| 5,408,914 | 4/1995 | Breitweiser et al. | 84/455 X |

FOREIGN PATENT DOCUMENTS

| | | |
|---|---|---|
| 0048622 | 4/1980 | Japan . |
| 0095327 | 4/1988 | Japan . |

*Primary Examiner*—Elizabeth L. Dougherty

[57] ABSTRACT

The Tension Loss/Frequency Comparison Device is a simple and convenient way to determine, within a few hundred pulses, if two independent frequencies are identical in pulses per second. One frequency is essentially a controlled frequency; the other frequency is a randomly occurring frequency, such as the natural frequency of a taut string when it is excited, to be compared, in pulses per second, within a given time frame, to the controlled frequency. If the two frequencies are equal in time, a light is briefly turned on. The controlled frequency is continuously converted to a value representing the tension in a taut string, and displayed on an LCD; the frequency to be compared is the detected and amplified natural frequency of the taut string under test. If the light turns on, shortly after the taut string is excited, indicating an agreement in frequencies, the value shown on the LCD represents the tension in the taut string.

7 Claims, 4 Drawing Sheets

TENSION LOSS/FREQUENCY COMPARISON DEVICE

BACKGROUND OF THE INVENTION

Although there may be other uses for the Tension Loss/Frequency Comparison Device its use as a means of accurately determining tension loss in a tennis racket will be investigated here, primarily because no practical device now exists, and the market is potentially large.

It is desirous to know if a device, such as a tennis racket, has lost tension by an accurate method, to determine if, in the case of the tennis racket, it should be restrung for better play or even for psychological reasons. The tension of a taut string, to its frequency, is related by the following formula:

$$T=Kf^2$$

where

T=Tension, lbs
f=frequency
K=a constant

This formula may be used to determine the tension lost in a taut string. Boyden (U.S. Pat. No. 5,406,827) teaches that change (loss) in the characteristic fundamental frequency (pitch) of the tennis racket, with use, may be employed to determine the tension loss in the racket. This frequency is essentially compared to a known frequency in making this determination. The racket is tapped to ascertain its characteristic frequency; a known frequency, emanating an audible tone, is then adjusted to agree with the racket frequency, as determined by the ear; the extrapolated tension of the racket, in pounds, will then be displayed.

While this approach will give a rough approximation of the loss in tension, it is limited in practicality due to the inability of the ear to accurately determine the identity of two frequencies. It can be seen, by the above formula, that since the tension changes as the square of the frequency, a small change in frequency will result in a considerably larger change in tension. For instance, if the racket is strong to 50 lbs, and the frequency is 300 hertz, a loss in frequency of 3 hertz will indicate a loss in tension of 1 pound. A half-tone change in the musical scale involves a frequency change of approximately 18 hertz. A change in pitch of 3 hertz, or one sixth of a half-tone, must be detected by the ear to determine a frequency loss comparable to 1 pound of tension loss.

It is obvious that a more accurate method of determining identity of frequencies, even to the trained ear, is required.

DESCRIPTION OF THE INVENTION

The Tension Loss/Frequency Comparison Device does not depend on the ability of the ear to determine identity of frequencies. Instead, when the two frequencies are identical, such identity being determined more precisely by electrical means, a light will go on.

To determine the tension loss, the racket is sounded by tapping the racket with a small mallet or other such implement; a transducer inside the device transposes this sound or vibration to an electrical signal. This signal comprises the characteristic fundamental frequency, and some harmonics, of the racket. A frequency generator, inside the Tension Loss/Frequency Comparison Device, emanates an audible tone. This frequency generator is adjusted until its tone is in approximate agreement with the tone emanated from the racket when the racket is sounded; the frequency is now in the range. The frequency generator is then finely tuned until, the display light briefly goes on when the racket is tapped; the accurate tension of the racket is then read out on the display.

Since the identity of the two frequencies is electronically determined, it is much more accurate than an ear comparison. By this method, racket tension loss, to a fraction of a pound, may be determined; this makes the Tension Loss/Frequency Comparison Device much more practical.

In the electronic operation of the chip embodiment of the Tension Loss/Frequency Comparison Device, two pulse counters are used, —a frequency generator counter and a racket frequency counter.

Both counters count a pre-determined quantity of pulses; the racket frequency counter counts the frequency of the racket; the frequency generator counter counts the frequency of the frequency generator.

When the racket is tapped, a signal is picked up, which sets a flip-flop. Both counters begin counting from the reset state. When the frequency generator counter counts this pre-determined count, a window, equal in time to the inversion of the frequency generator frequency, is used, in conjunction with another flip-flop, to determine the identity of the two frequencies. If the racket frequency counter also counts this pre-determined count, within the time window, the second flip-flop is set. This second flip-flop is configured in the mono-stable made; if coincidence of pulses occurs, a light, such as an LED, is turned on for about 50 milliseconds.

The racket frequency counter, only counts pulses that are the result of the tappings of the racket and the consequent vibration of the racket strings.

Since the pre-determined fixed count of the frequency generator counter is about 100 pulses, this process of window comparison of pulse counts may occur several times as the persistence of vibration of the racket strings can be up to one second, depending on effective tapping of the strings. When the two frequencies are in exact identity the light will go on and off a maximum number of times after the racket is tapped.

List of Elements of the Drawings 1. means for producing X pulses.
2. means for producing Y pulses.
3. means for counting X pulses
4. means for counting Y pulses.
5. means for determining the identify of the quantity of X pulses, and Y pulses occurring within a given time frame.
6. means for displaying the identity of the quantity of X and Y pulses.
7. means for generating a signal.
8. a microphone or accelerometer.

9. an amplifier.
10. an A-flip-flop.
11. a B-gate.
12. an A counter.
13. a speaker.
14. an A gate.
15. a B counter.
16. a C gate.
17. a D gate.
18. a B flip-flop.
19. a capacitor.
20. a resistor.
21. a limiting resistor.
22. a light.
23. a B microphone or B accelerometer.
24. a B amplifier.
25. a power supply.
26. a switch.
27. a BCD switch.
28. a microprocessor.
29. an LCD display
30. a light.

DETAILED DESCRIPTION OF THE DRAWINGS

Since there are two aspects to the invention, a general concept, and a specific implementation of the concept; and since both aspects are novel, three embodiments are herein presented; a general concept embodiment, a chip embodiment and a microprocessor embodiment. The microprocessor embodiment is presented because of its reduction in component count, despite the added expenditure in development time and money.

Figure 1:
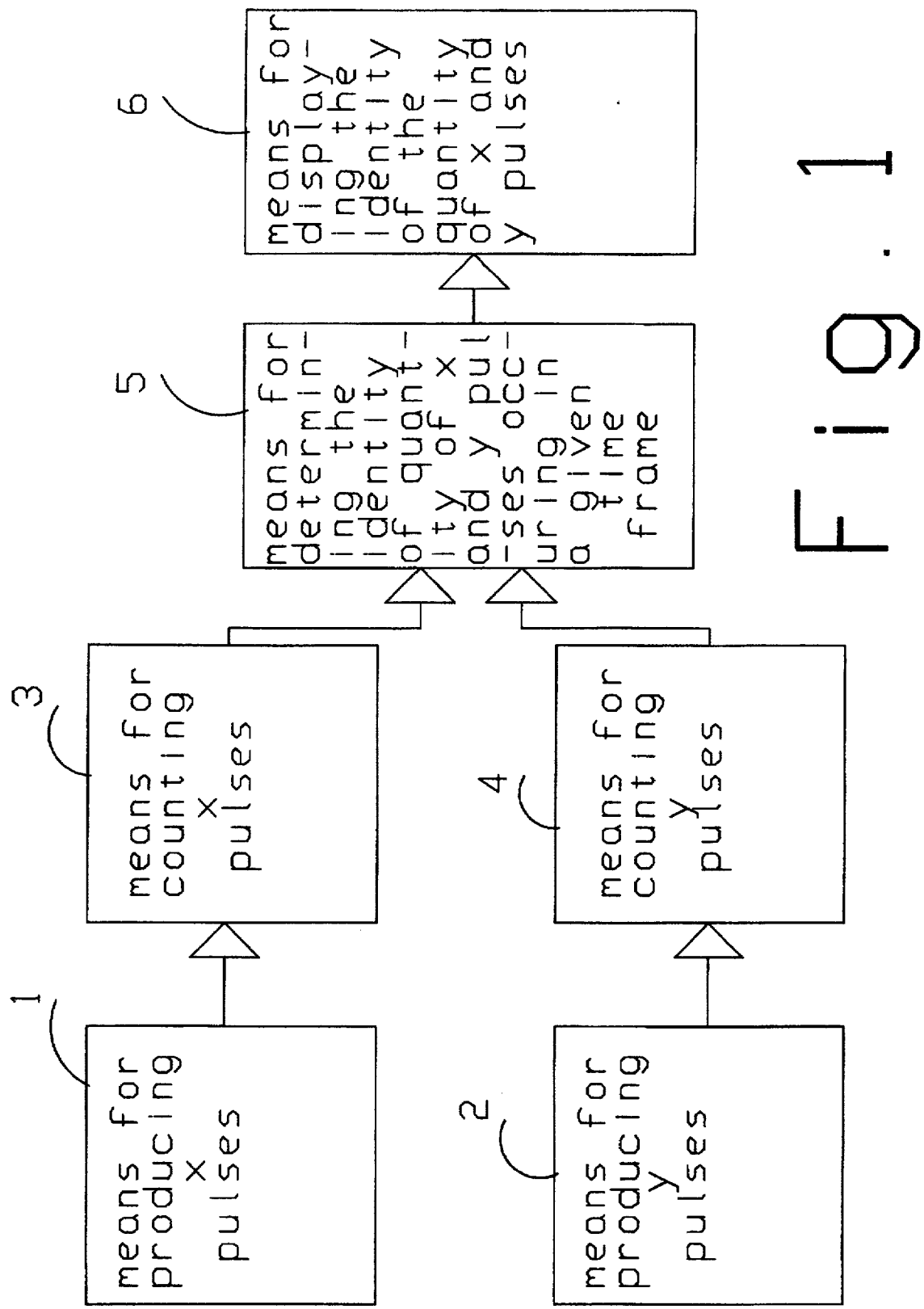
FIG. 1 is a block diagram depiction of the general concept embodiment of the Tension Loss/Frequency Comparison Device.

FIG. 1 depicts the general concept embodiment.

In FIG. 1, means for producing X pulses, 1, such as a microphone, accelerometer, or signal generator, is used to generate a series of pulses; a quantity of x pulses is counted by means for counting X pulses, 3.

In a similar manner, means for producing Y pulses, 2, such as a signal generator, generates a series of pulses; a quantity of Y pulses is counted by means for counting Y pulses, 4.

After a pre-determined amount of time, the identity of the quantity of X pulses and Y pulses is, determined by means for determining the identity of the quantity of X pulses and Y pulses occurring within a given time frame, 5.

If an identity occurs, means for displaying the identity of the quantity of X pulses and Y pulses, 6, gives an indication of this identity.

Figure 2:
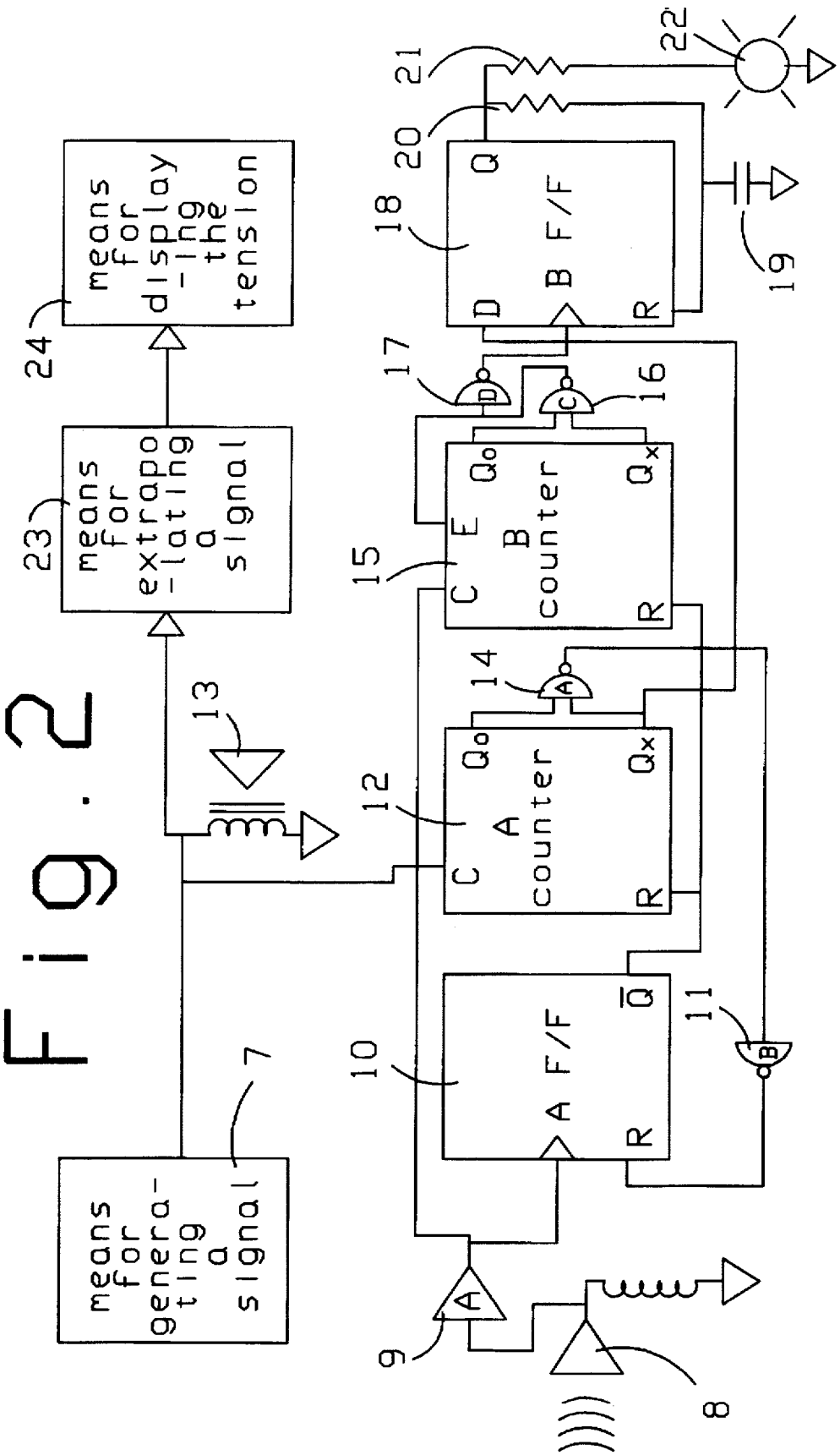
FIG. 2 is a symbolic representation of the chip embodiment of the Tension Loss/Frequency Comparison Device.

In FIG. 2, the chip embodiment, a practical device for measuring accurately and displaying the loss in tension of taut strings, such as a tennis racket, is depicted.

Upon tapping the racket, the microphone or accelerometer, 8, sets the A flip-flop, 10; the $\overline{Q}$ output of the A flip-flop, 10, enables the A counter, 12, and B counter, 15; the A counter, 12, begins counting the pulses from the means for generating a signal, 7; when the $Q_o$ output and $Q_x$ output of the A counter, 12, go high, the A gate, 14, goes low, the B gate, 11, goes high, the $\overline{Q}$ output of the A flip-flop, 10, goes low, and the A counter, 12, and B counter, 15, are reset. When the A flip-flop, 10, goes high, as stated above, the B counter, 15, will count the pulses coming from the microphone or accelerometer, 8, via the amplifier, 9. These pulses represent the incoming sound vibrations such as the vibrations emanating from the taut strings of a racket after it is tapped. The $Q_x$ output of the A counter, 12, is high for a short duration just prior to resetting of the A flip-flop, 10; this short duration is a time equal to the reciprocal of the frequency of the means for generating a signal, 7. The $Q_x$ output of the A counter, 12, is presented to the D input of the B flip-flop 18. When the $Q_x$ output of the A counter, 12, is high, if the count in both the A counter, 12, and the B counter, 15, is identical, the $Q_o$ output and $Q_x$ output of the B counter, 15, will go high, the C gate, 16, will go low, the D gate, 17, will go high, and the B flip-flop, 18, will be set; the Q output of the B flip-flop, 18, will go high, turning the light, 22, on; the capacitor, 19, will begin to charge. After about 50 milliseconds, the B flip-flop, 18, will be reset, and the light, 22, will go off.

The light, 22, will only go on if there is an identical count in both the A counter, 12, and B counter, 15.

An audible tone, equal to essentially the fundamental frequency of the means for generating a signal, 7, is emanated from the speaker, 13. The frequency of the means for generating a signal, 7, is extrapolated to a tension in pounds, in the case of the racket tension loss application, by the means for extrapolating the signal to a tension, 23, and displayed on a device such as an LCD, by the means for displaying the tension, 24.

Figure 3:
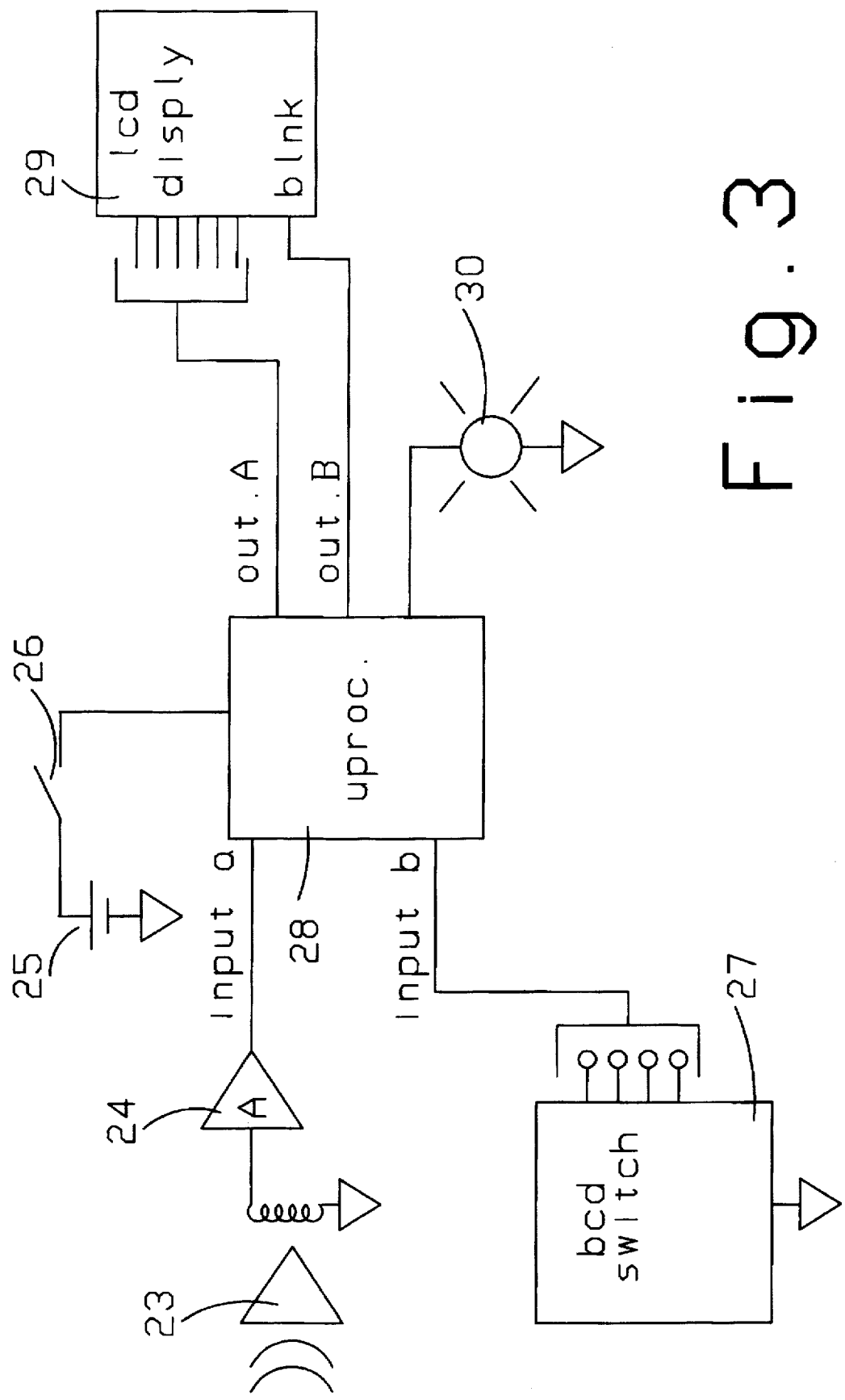
FIG. 3 is a symbolic representation of the microprocessor embodiment of the Tension Loss/Frequency Comparison Device.
Figure 4:
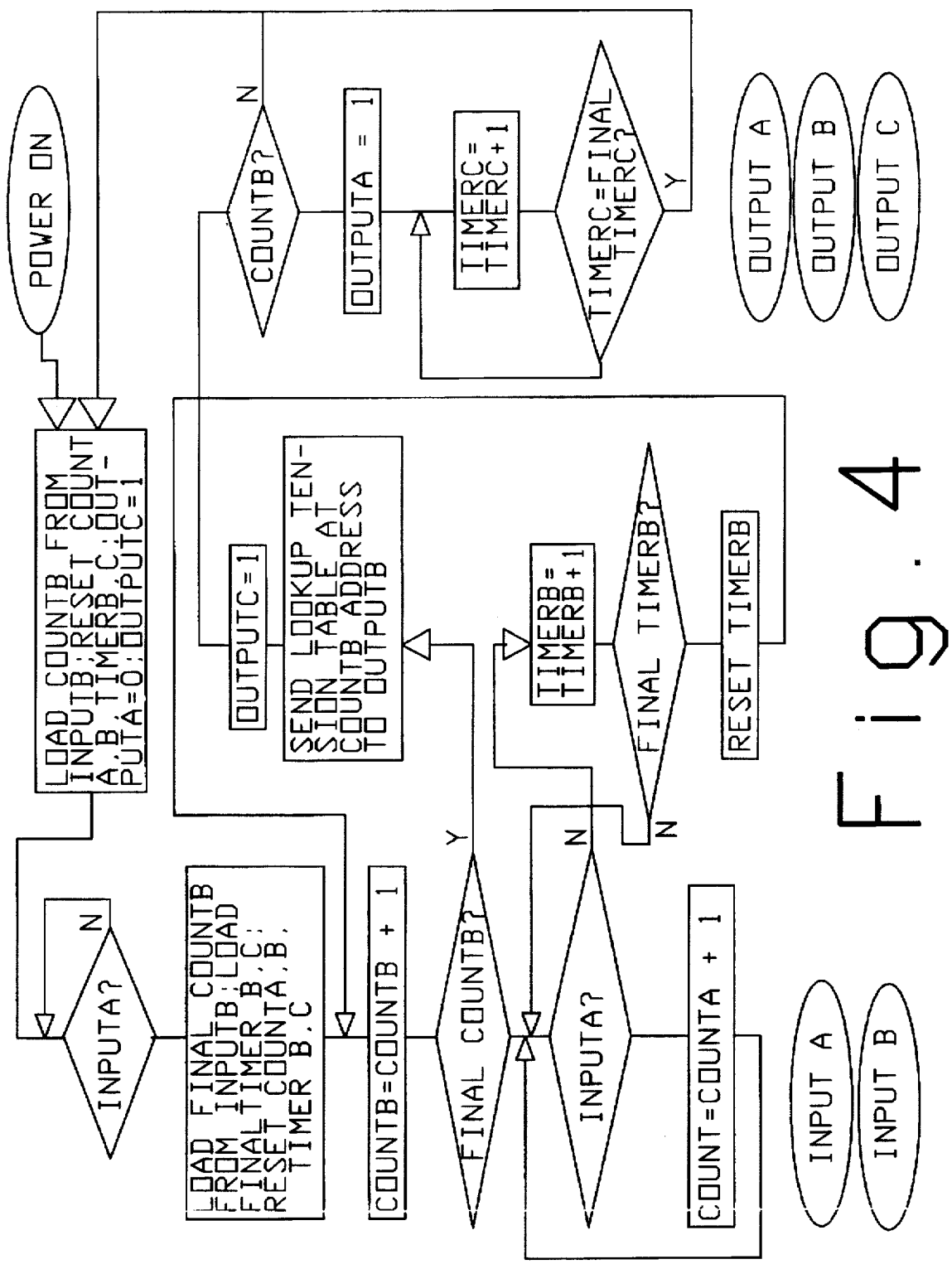
FIG. 4 is a flow diagram depicting the firmware program in the microprocessor of the microprocessor embodiment.

In FIG. 3, the microprocessor embodiment, the operation is essentially the same as in the chip embodiment. The microprocessor embodiment operation is further clarified by the flow diagram in FIG. 4.

I claim:

1. A Tension Loss/Frequency Comparison Device whereby the tension, and loss of tension, of a tightly strung apparatus, such as a tennis racket, from a previously known tension, may be determined by comparing the fundamental frequency of said apparatus to an audible frequency generated by said tension loss/frequency comparison device, comprising:

a microphone,
    said microphone being capable of transducing an audible tone to an electrical signal, an amplifier wherein:
    the input of said amplifier is connected to the output of said microphone, means for generating a signal, an A flip-flop wherein:
    the clock input of said A flip-flop is connected to the output of said amplifier, an A counter wherein:
    the clock input of said A counter is connected to the output of said means for generating a signal, an A gate wherein:
    the first input of said A gate is connected to the $Q_o$ output of said A counter,
    the second input of said A gate is connected to the $Q_x$ output of said A counter, a B gate wherein:
    the input of said B gate is connected to the output of said A gate,
    the output of said B gate is connected to the reset of said A flip-flop, a B counter wherein:
    the clock of said B counter is connected to the output of said amplifier, the reset of said B counter is connected to the reset of said A counter and the $\overline{Q}$ output of said A flip-flop, a C gate wherein:
the first input of said C gate is connected to the $Q_o$ output of said B counter,
the second input of said C gate is connected to the $Q_x$ output of said B counter, a D gate wherein:
the input of said D gate is connected to the output of said C gate and the enable of said B counter, a B flip-flop wherein:
the clock of said B flip-flop is connected to the output of said D gate,
the D input of said B flip-flop is connected to the $Q_x$ output of said A counter, a resistor wherein:
one side of said resistor is connected to the Q output of said B flip-flop, a power supply, a capacitor wherein:
the first side of said capacitor is connected to the other side of said resistor and the reset of said B flip-flop,
the second side of said capacitor is connected to the return of said power supply, a light wherein:
one side of said light is connected to the Q output of said B flip-flop,
the other side of said light is connected to the return of said power supply,
wherein said tension loss/frequency comparison device provides a convenient way of determining the identity of two independent frequencies.

2. A Tension Loss/Frequency Comparison Device whereby the tension, and loss of tension, of a tightly strung apparatus, such as a tennis racket, from a previously known tension, may be determined by comparing the fundamental frequency of said apparatus to an audible frequency generated by said tension loss/frequency comparison device, comprising:

an accelerometer,
said accelerometer being capable of transducing an audible tone to an electrical signal, an amplifier wherein:
the input of said amplifier is connected to the output of said accelerometer, means for generating a signal, an A flip-flop wherein:
the clock input of said A flip-flop is connected to the output of said amplifier, an A counter wherein:
the clock input of said A counter is connected to the output of said means for generating a signal, an A gate wherein:
the first input of said A gate is connected to the $Q_o$ output of said A counter,
the second input of said A gate is connected to the $Q_x$ output of said A counter, a B gate wherein:
the input of said B gate is connected to the output of said A gate,
the output of said B gate is connected to the reset of said A flip-flop, a B counter wherein:
the clock of said B counter is connected to the output of said amplifier, the reset of said B counter is connected to the reset of said A counter and the Q output of said A flip-flop, a C gate wherein:
the first input of said C gate is connected to the $Q_o$ output of said B counter,
the second input of said C gate is connected to the $Q_x$ output of said B counter, a D gate wherein:
the input of said D gate is connected to the output of said C gate and the enable of said B counter, a B flip-flop wherein:
the clock of said B flip-flop is connected to the output of said D gate,
the D input of said B flip-flop is connected to the $Q_x$ output of said A counter, a resistor wherein:
one side of said resistor is connected to the Q output of said B flip-flop, a power supply, a capacitor wherein:
the first side of said capacitor is connected to the other side of said resistor and the reset of said B flip-flop,
the second side of said capacitor is connected to the return of said power supply, a light wherein:
one side of said light is connected to the Q output of said B flip-flop,
the other side of said light is connected to the return of said power supply,
wherein said tension loss/frequency comparison device provides a convenient way of determining the identity of two independent frequencies.

3. The Tension Loss/Frequency Comparison Device of claim 2 further including:
a speaker wherein:
a first side of said speaker is connected to the output of said means for generating a signal,
a second other side of said speaker is connected to the return of said power supply.

4. The Tension Loss/Frequency Comparison Device of claim 2 further including:
means for extrapolating the signal of said means for generating a signal to indicate a tension,
means for displaying the tension of said means for extrapolating the signal of said means for generating a signal to indicate a tension.

5. A Tension Loss/Frequency Comparison Device whereby the tension, and loss of tension, of a tightly strung apparatus, such as a tennis racket, from a previously known tension, may be determined by comparing the fundamental frequency of said apparatus to an audible frequency generated by said tension loss/frequency comparison device, comprising:

means for generating an electrical signal A, means for generating an electrical signal B, an A flip-flop wherein:
the clock input of said A flip-flop is connected to the output of said amplifier, an A counter wherein:
the clock input of said A counter is connected to the output of said means for generating a signal B, an A gate wherein:
the first input of said A gate is connected to the $Q_o$ output of said A counter,
the second input of said A gate is connected to the $Q_x$ output of said A counter.

a B gate wherein:
  the input of said B gate is connected to the output of said A gate,
  the output of said B gate is connected to the reset of said A flip-flop,
a B counter wherein:
  the clock of said B counter is connected to the output of said means for generating an electrical signal A,
  the reset of said B counter is connected to the reset of said A counter and the $\bar{Q}$ output of said A flip-flop,
a C gate wherein:
  the first input of said C gate is connected to the $Q_o$ output of said B counter,
  the second input of said C gate is connected to the $Q_x$ output of said B counter,
a D gate wherein:
  the input of said D gate is connected to the output of said C gate and the enable of said B counter,
a B flip-flop wherein:
  the clock of said B flip-flop is connected to the output of said D gate,
  the D input of said B flip-flop is connected to the $Q_x$ output of said A counter,
a resistor wherein:
  one side of said resister is connected to the Q output of said B flip-flop,
a power supply,
a capacitor wherein:
  the first side of said capacitor is connected to the other side of said resistor and the reset of said B flip-flop,
  the second side of said capacitor is connected to the return of said power supply,
a light wherein:
  one side of said light is connected to the Q output of said B flip-flop,
  the other side of said light is connected to the return of said power supply,
  wherein said tension loss/frequency comparison device provides a convenient method for comparing two independent frequencies.

6. A Tension Loss/Frequency Comparison Device whereby the tension, and loss of tension, of a tightly strung apparatus, such as a tennis racket, from a previously known tension, may be determined by comparing the fundamental frequency of said apparatus to an audible frequency generated by said tension loss/frequency comparison device, comprising:
  a microprocessor,
  means for generating an electrical signal wherein:
    the output of said means for generating an electrical signal is connected to the A input of said microprocessor,
  A BCD switch wherein:
    the outputs of said BCD switch are connected to the B inputs of said microprocessor,
  a power supply,
  a switch wherein:
    the first side of said switch is connected to the output of said power supply,
    the second side of said switch is connected to the power supply input of said microprocessor,
  an LCD display wherein:
    the inputs of said LCD display are connected to the A outputs of said microprocessor,
    the blank of said LCD display is connected to the C output of said microprocessor,
    the return of said LCD display is connected to the return of said power supply,
  a light wherein:
    the first side of said light is connected to the B output of said microprocessor,
    the second side of said light is connected to the return of said power supply,
    wherein said tension loss/frequency comparison device provides a microprocessor method for comparing two independent frequencies.

7. A Tension Loss/Frequency Comparison Device whereby the tension, and loss of tension, of a tightly strung apparatus, such as a tennis racket, from a previously known tension, may be determined by comparing the fundamental frequency of said apparatus to an audible frequency generated by said tension loss/frequency comparison device, comprising:
  a microprocessor,
  a B accelerometer,
  a B amplifier,
    the input of said B amplifier is connected to the output of said B accelerometer,
    the output of said B amplifier is connected to the A input of said microprocessor,
  A BCD switch wherein:
    the outputs of said BCD switch are connected to the B inputs of said microprocessor,
  a power supply,
  a switch wherein:
    the first side of said switch is connected to the output of said power supply,
    the second side of said switch is connected to the power supply input of said microprocessor,
  an LCD display wherein:
    the inputs of said LCD display are connected to the A outputs of said microprocessor,
    the blank of said LCD display is connected to the C output of said microprocessor,
    the return of said LCD display is connected to the return of said power supply,
  a light wherein:
    the first side of said light is connected to the B output of said microprocessor,
    the second side of said light is connected to the return of said power supply,
    wherein said tension loss/frequency comparison device provides a microprocessor method of comparing two frequencies wherein one frequency is generated by an accelerometer.

* * * * *